United States Patent [19]

Yoshida

[11] Patent Number: 4,656,887

[45] Date of Patent: Apr. 14, 1987

[54] TILTABLE STEERING COLUMN WITH ADJUSTABLE LOCKING PAWL

[75] Inventor: Moritaka Yoshida, Toyota, Japan

[73] Assignee: Toyota Jidosha Kabushiki Kaisha, Aichi, Japan

[21] Appl. No.: 811,289

[22] Filed: Dec. 20, 1985

[30] Foreign Application Priority Data

Dec. 21, 1984 [JP] Japan .......................... 59-194737[U]

[51] Int. Cl.⁴ .......................... B62D 1/18; G05G 5/24
[52] U.S. Cl. ...................................... 74/493; 74/522; 74/540; 74/571 M; 74/577 M
[58] Field of Search ................. 74/493, 522, 540, 535, 74/571 M, 577 S, 577 M; 280/775; 297/369, 379

[56] References Cited

U.S. PATENT DOCUMENTS

| | | | |
|---|---|---|---|
| 2,188,635 | 1/1940 | Dusen, Jr. | 74/522 X |
| 3,302,478 | 2/1967 | Pauwels | 74/493 |
| 3,628,396 | 12/1971 | Grobowski | 74/493 |
| 4,084,449 | 4/1978 | Kine | 74/522 X |
| 4,530,254 | 7/1985 | Toyoda et al. | 74/540 |
| 4,538,477 | 9/1985 | Kurusu et al. | 74/540 X |
| 4,538,478 | 9/1985 | Sato et al. | 74/540 X |

FOREIGN PATENT DOCUMENTS

| | | |
|---|---|---|
| 57-53730 | 11/1982 | Japan . |
| 58-163354 | 10/1983 | Japan . |
| 61-21671 | 2/1986 | Japan . |
| 1018485 | 1/1966 | United Kingdom ................. 74/493 |
| 703401 | 12/1979 | U.S.S.R. .............................. 74/493 |

Primary Examiner—Allan D. Herrmann
Attorney, Agent, or Firm—Parkhurst & Oliff

[57] ABSTRACT

This tiltable steering column is for an automotive vehicle, and includes a main steering shaft made up from a lower steering shaft and an upper steering shaft tiltably rotationally connected to the lower steering shaft, and a column tube assembly which includes a lower tube which rotatably supports the lower steering shaft from the body of the automotive vehicle and an upper tube which rotatably supports the upper steering shaft and is pivotally mounted so as to be able to tilt relative to the lower tube. A tilt locking mechanism also included in the steering shaft includes a first side ratchet mechanism on one side of the column tube assembly and a second side ratchet mechanism on the other side of the column tube assembly. Each such side ratchet mechanism includes a ratchet fixedly attached to one of the upper tube and the lower tube, a pawl pivotally attached to the other of the upper tube and the lower tube, a means which acts constantly for biasing the pawl so as to engage it with the ratchet, and a means for selectively biasing the pawl so as to release its engagement with the ratchet. And the tilt locking mechanism also includes a means for coupling the operation of the two pawl releasing means together, and a means for shifting the axis of pivotal rotation of one of the pawls. Thereby errors in manufacture and assembly can be compensated for by adjusting the axis of pivotal rotation of this pawl, thus assuring good operability and assemblability of the steering shaft.

3 Claims, 18 Drawing Figures

TILTABLE STEERING COLUMN WITH ADJUSTABLE LOCKING PAWL

BACKGROUND OF THE INVENTION

The present invention relates to a tiltable steering column for an automotive vehicle, and in particular to a tiltable steering column for an automotive vehicle, suitable for being adjusted so as to conform the driving position to the particular physical build and preference of an individual driver, which is improved in terms of ease of assembly.

Generally, a tiltable steering column for an automotive vehicle comprises a main steering shaft comprising a lower steering shaft and an upper steering shaft tiltably rotationally connected to said lower steering shaft, and a column tube assembly, comprising a lower tube which rotatably supports said lower steering shaft from the body of said automotive vehicle, and an upper tube which rotatably supports said upper steering shaft and is pivotally mounted so as to be able to tilt relative to said lower tube. Further, it is known for such a tiltable steering column for an automotive vehicle to comprise a tilt locking mechanism which comprises a ratchet mechanism comprising: a ratchet fixedly attached to one of said upper tube and said lower tube; a pawl pivotally attached to the other of said upper tube and said lower tube; a means for biasing said pawl so as to engage it with said ratchet, which acts constantly; and a means for selectively biasing said pawl so as to release its said engagement with said ratchet. Thereby, by operating the releasing means for the pawl, the engagement of the pawl to the ratchet is released, and the upper tube can be rotatably tilted with respect to the lower tube, thus enabling the position of the steering wheel, which is fixed to the upper end of the upper steering shaft, to be adjusted so as to conform the driving position to the particular physical build and preference of an individual driver.

According to such a tiltable type steering column, for instance the ones disclosed in Japanese Utility Model Publication Serial No. 57-53730 ad Japanese Utility Model Laying Open Publication Serial No. 58-163354, neither of which is it intended hereby to admit a prior art to the present application except to the extent otherwise required by the law, the upper tube is rotationally locked with respect to the lower tube and thus the vehicle body by the tilt locking mechanism; but, since the tilt locking mechanism is in principle provided only on one side of the steering column assembly, the lateral support rigidity for the upper tube is not always sufficient, and good vibrational characteristics cannot be assured in all cases. Additionally in the worst case, sideways skewing of the steering wheel could occur.

In view of these problems, the present applicant, in Japanese Utility Model Publication Serial No. 61-21671 which is also not intended as prior art to the present application except to the extent otherwise required by law, has proposed a tiltable steering column in which two such tilt locking mechanisms are located one on each side of the steering column; and the two release levers of these two tilt locking mechanisms are synchronized by way of a connecting shaft.

As a result, in such a tilt steering device, since the upper tube of the steering column is supported by a pair of tilt locking mechanisms arranged on both sides of the steering column, the lateral rigidity of the support of the upper tube can be increased, and good vibrational characteristics can be obtained, with the additional advantage that, since the release levers of the two tilt locking mechanisms are synchronized, the rotational operation of only one of the release levers is required for releasing the locking action of the two tilt locking mechanisms, and accordingly the operability of the device is quite good.

However, the problem arises that, since the two sides of the upper and lower tubes are individually locked together by the two tilt locking mechanisms, the accuracy of fitting of these mechanisms is crucial. Specifically, a slight difference in the phases of the teeth of the two ratchets can prevent the proper engagement of one of the two tilt locking mechanisms, and it is extremely difficult to properly ensure simultaneous meshing of the two pawls with the two ratchets, because of the inevitability of manufacturing errors and assembling errors of the steering column structure.

SUMMARY OF THE INVENTION

Accordingly, it is the primary object of the present invention to provide a tiltable steering column which overcomes the above outlined problems.

It is a further object of the present invention to provide such a tiltable steering column which provides good stability for the support of the upper tube member thereof and for the steering wheel.

It is a further object of the present invention to provide such a tiltable steering column which is not prone to any sideways skewing of the steering wheel.

It is a further object of the present invention to provide such a tiltable steering column which has two such tilt locking mechanisms on either side of the steering column, and which is not prone to difficulties with proper simultaneous engagement of said tilt locking mechanisms.

It is a further object of the present invention to provide such a tiltable steering column which has two such tilt locking mechanisms on either side of the steering column, and in which said two tilt locking mechanisms can both reliably be simultaneously engaged.

It is a further object of the present invention to provide such a tiltable steering column, the operation of which does not suffer unduly due to moderate deviances from manufacturing or assembly specifications.

It is a yet further object of the present invention to provide such a tiltable steering column which is easy to assemble.

It is a yet further object of the present invention to provide such a tiltable steering column which has good vibrational characteristics.

According to the most general aspect of the present invention, these and other objects are accomplished by a tiltable steering column for an automotive vehicle, comprising: (a) a main steering shaft comprising a lower steering shaft and an upper steering shaft tiltably rotationally connected to said lower steering shaft; (b) a column tube assembly, comprising: (b1) a lower tube which rotatably supports said lower steering shaft from the body of said automotive vehicle; and: (b2) an upper tube which rotatably supports said upper steering shaft and is pivotally mounted so as to be able to tilt relative to said lower tube; and: (c) a tilt locking mechanism, comprising a first side ratchet mechanism on one side of said column tube assembly and a second side ratchet mechanism on the other side of said column tube assembly, each comprising: (c1) a ratchet fixedly attached to one of said upper tube and said lower tube; (c2) a pawl pivotally attached to the other of said upper tube and said lower tube; (c3) a means for biasing said pawl so as to engage it with said ratchet, which acts constantly; and: (c4) a means for selectively biasing said pawl so as to release its said engagement with said ratchet; and further comprising: a means for coupling the operation of said pawl releasing means together; and: a means for shifting the axis of pivotal rotation of one of said pawls.

According to such a structure, since the center of the swinging motion of the eccentric cam can be positionally adjusted by rotationally operating the eccentric cam when mounting the other of the pawls to the column tube while it is meshed with the first ratchet, and then mounting the one of the pawls to the column tube, mismatching of the phases of the pawls to the teeth of the ratchets can be easily adjusted during assembly, and their meshing can be assured. Hence, there is provided a tiltable steering column which overcomes the problems outlined above with respect to other constructions, and which provides good stability for the support of the upper tube member thereof and for the steering wheel, as well as to being prone to any sideways skewing of the steering wheel. Further, this tiltable steering column has two tilt locking mechanisms, one on either side of the steering column, and yet is not prone to difficulties with proper simultaneous engagement of said tilt locking mechanisms, and does not suffer unduly due to moderate deviances from manufacturing or assembly specifications. Thus, this tiltable steering column is easy to assemble and has good vibrational characteristics.

BRIEF DESCRIPTION OF THE DRAWINGS

The present invention will now be shown and described with reference to the preferred embodiments thereof, and with reference to the illustrative drawings. It should be clearly understood, however, that the description of the embodiments, and the drawings, are given purely for the purposes of explanation and exemplification only, and are not intended to limit the scope of the present invention in any way, since the scope of the present invention is to be defined solely by the legitimate and proper scope of the appended claims. In the drawings, like parts and spaces and so on are denoted by like reference symbols in the various figures thereof; in the description, spatial terms are to be everywhere understood in terms of the relevant figure; and:

DESCRIPTION OF THE PREFERRED EMBODIMENTS

Figure 1:
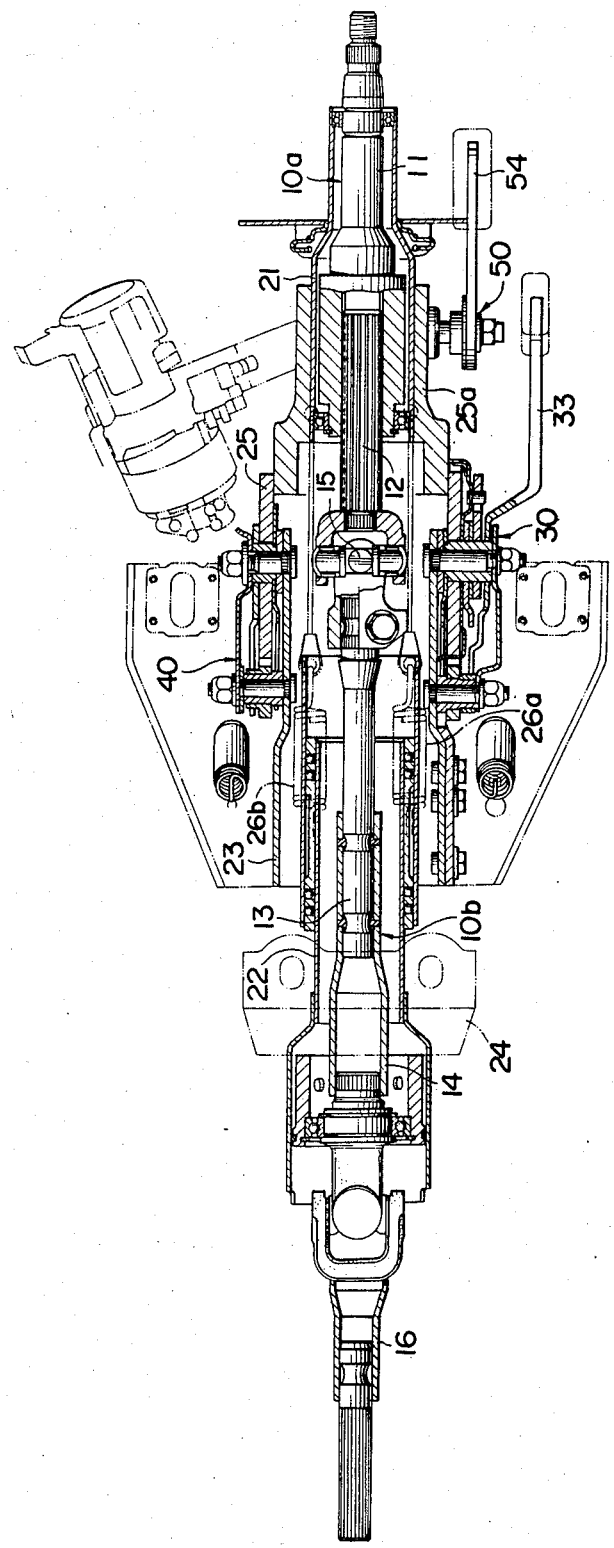
FIG. 1 is a partly schematic sectional view of the first preferred embodiment of the tilt steering column assembly of the present invention taken in a sectional plane containing the longitudinal axis of said column assembly (which is shown as extended substantially straight) and parallel to the transverse axis of the vehicle to which said column assembly is fitted.
Figure 2:
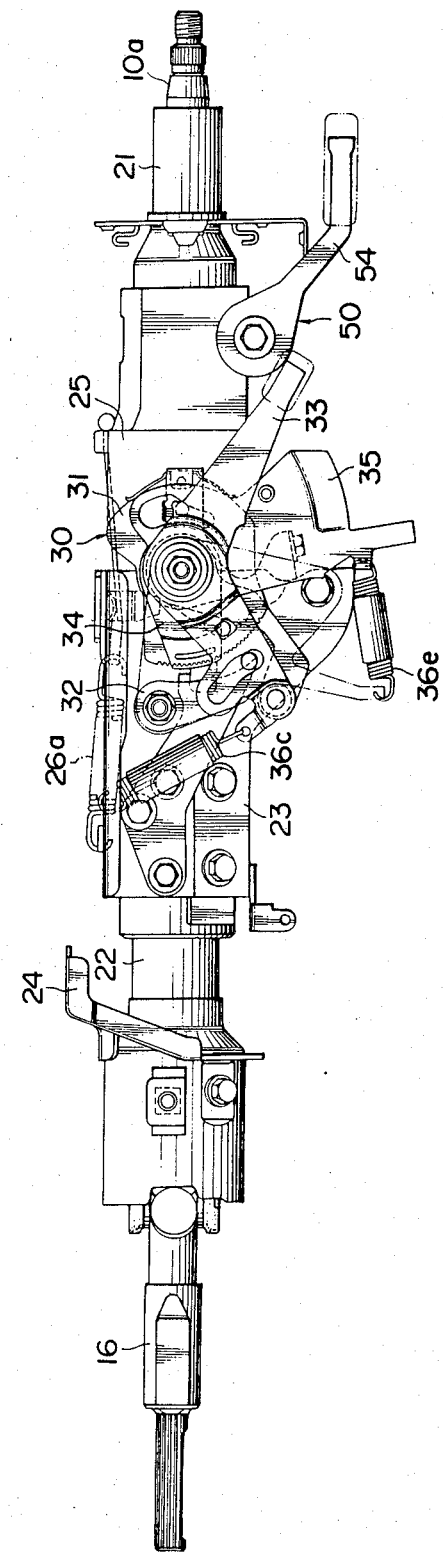
FIG. 2 is a side view of said first preferred embodiment tilt steering column assembly, shown by itself.
Figure 3:
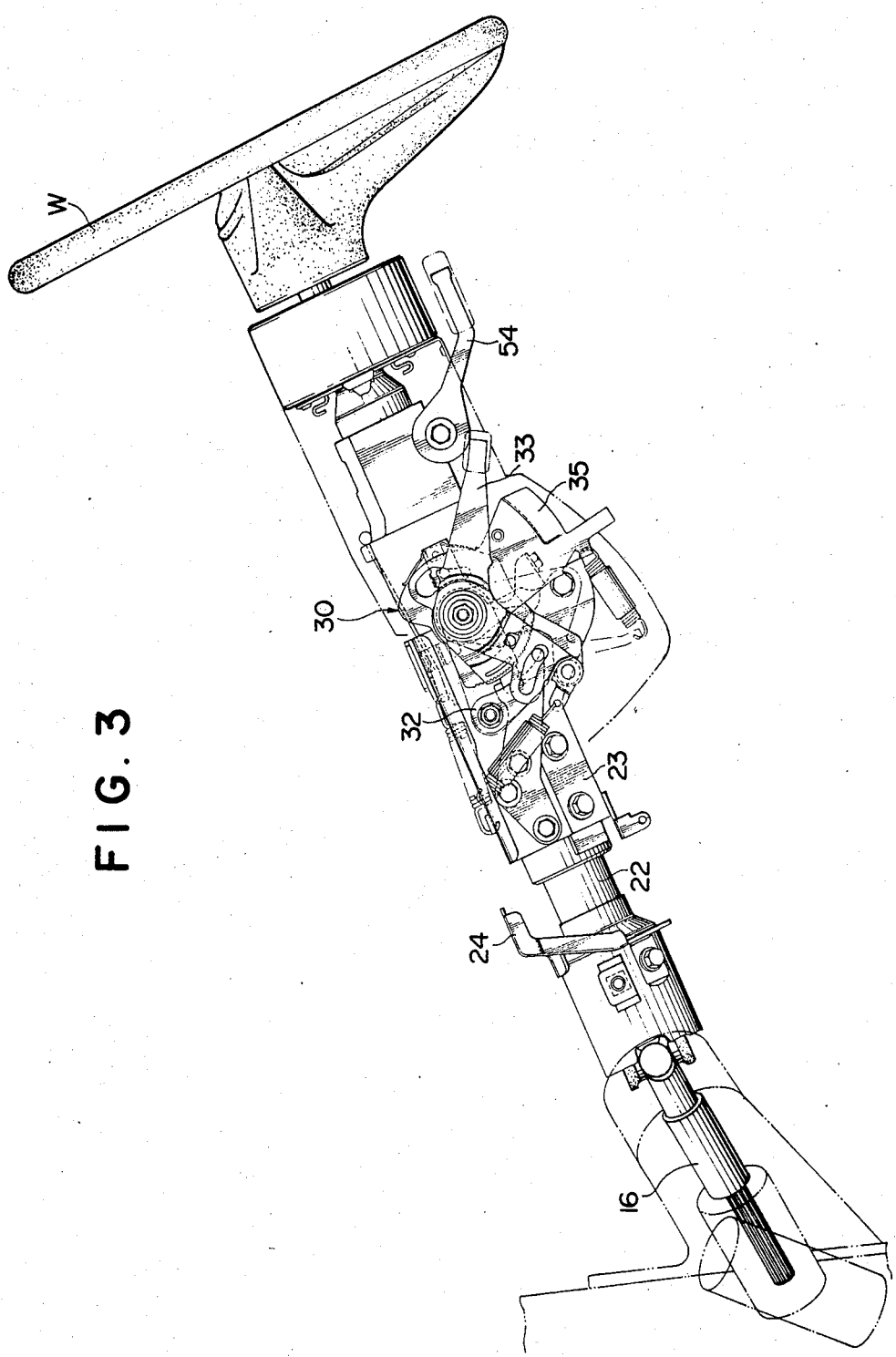
FIG. 3 is a side view of said first preferred embodiment tilt steering column assembly, shown its state of being mounted to a vehicle body.

The present invention will now be described with reference to the preferred embodiments thereof, and with reference to the appended drawings. FIG. 1 is a longitudinal sectional view of the first preferred embodiment of the tilt steering column assembly of the present invention taken in as near a horizontal longitudinal sectional plane as possible, FIG. 2 is a side view of said tilt steering column assembly by itself, and FIG. 3 is a side view of said tilt steering column assembly showing it in the state of being mounted to a vehicle body. In these figures, the reference numeral 10a denotes an upper steering shaft assembly, which is made up from a first shaft 11 and a second shaft 12; similarly, the reference numeral 10b denotes a lower steering shaft assembly, which is made up from a third shaft 13 and a fourth shaft 14. In said upper steering shaft assembly 10a, said first shaft 11 is rotationally coupled to said second shaft 12 but is left free to move axially with respect thereto, by a male splined portion on the right end in FIG. 1 of said second shaft 12 being fitted engagingly with a female splined portion formed on the left end in FIG. 1 of said first shaft 11. On the other hand, in said lower steering shaft assembly 10b, said third shaft 13 is coupled to said fourth shaft 14 both with regard to relative rotational movement and with regard to relative axial movement therebetween, by a portion on the right end in FIG. 1 of said fourth shaft 14 being fitted over and being fixedly coupled to a portion formed on the left end in FIG. 1 of said third shaft 13, said coupling being quite weak so as to allow for the collapse of the steering column assembly in an impact situation. The left end of the second shaft 12 is coupled to the right end in said figure of the third shaft 13 by a universal joint 15, thus rotationally coupling the upper and lower steering shaft assemblies 10a and 10b while allowing some bending between them; and the left end of the fourth shaft 14 is connected via a universal joint to a stub shaft 16 which leads to a steering box, while the right end of the first shaft 11 is adapted for mountingly receiving a steering wheel W, not shown in FIGS. 1 and 2 but shown in FIG. 3.

Around this steering shaft assembly there is fitted a steering column tube assembly, comprising an upper tube 21 which rotatably supports the first shaft 11 of the upper shaft assembly 10a via a pair of bearings, and a lower tube 22 which rotatably supports the fourth shaft 14 of the lower shaft assembly 10b via a bearing. The lower tube 22 is fixedly mounted to the vehicle body, hanging below the instrument panel thereof, via a main fixing bracket 23 attached to a higher portion of said lower tube 22 and an auxiliary fixing bracket 24 attached to a lower portion of said lower tube 22.

The upper tube 21 is slidably fitted into a tubular portion of a rotatable bracket 25, which is supported, so as to be rotatable around a horizontal axis substantially transverse to the body of the vehicle, by the two sides of the right end in FIG. 1 of the main fixing bracket 23. This sliding of the upper tube 21 in the rotatable bracket 25 is selectively fixable, by the driver of the vehicle operating a lock mechanism 50 via a lock lever 54 as will be described hereinafter. Thus, by releasing the locking of the upper tube 21 to the rotatable bracket 25, the upper tube 21 can axially slide relative to said rotatable bracket 25 with the second shaft 12 sliding inside the first shaft 11, thus providing axial adjustment of the steering wheel W and allowing telescopic operation of the steering column as a whole.

A pair of tension coil springs 26a and 26b are provided extending between the main fixing bracket 23 and the rotatable bracket 25, for counterbalancing the weight of the upper tube 21, the upper steering shaft assembly 10a, the steering wheel W, and so on, and further a pair of tilt locking mechanisms 30 and 40 are provided, one on either side of the steering column, for selectively either locking together the main fixing bracket 23 and the rotatable bracket 25, or releasing said locking together of said main fixing bracket 23 and said rotatable bracket 25 so that they can rotate with respect to one another about said horizontal axis substantially transverse to the body of the vehicle, thus providing tilting adjustment of the steering wheel W and allowing tilting operation of the steering column as a whole.

Now tilt locking mechanism 30 will be described, with reference to FIGS. 4 through 7 which show it as a whole and FIGS. 8 through 11 which show individual parts of it. This first tilt locking mechanism 30 comprises a ratchet 31, a pawl 32, a first release lever 33, a cover plate 34 and a second release lever 35.

Figure 4:
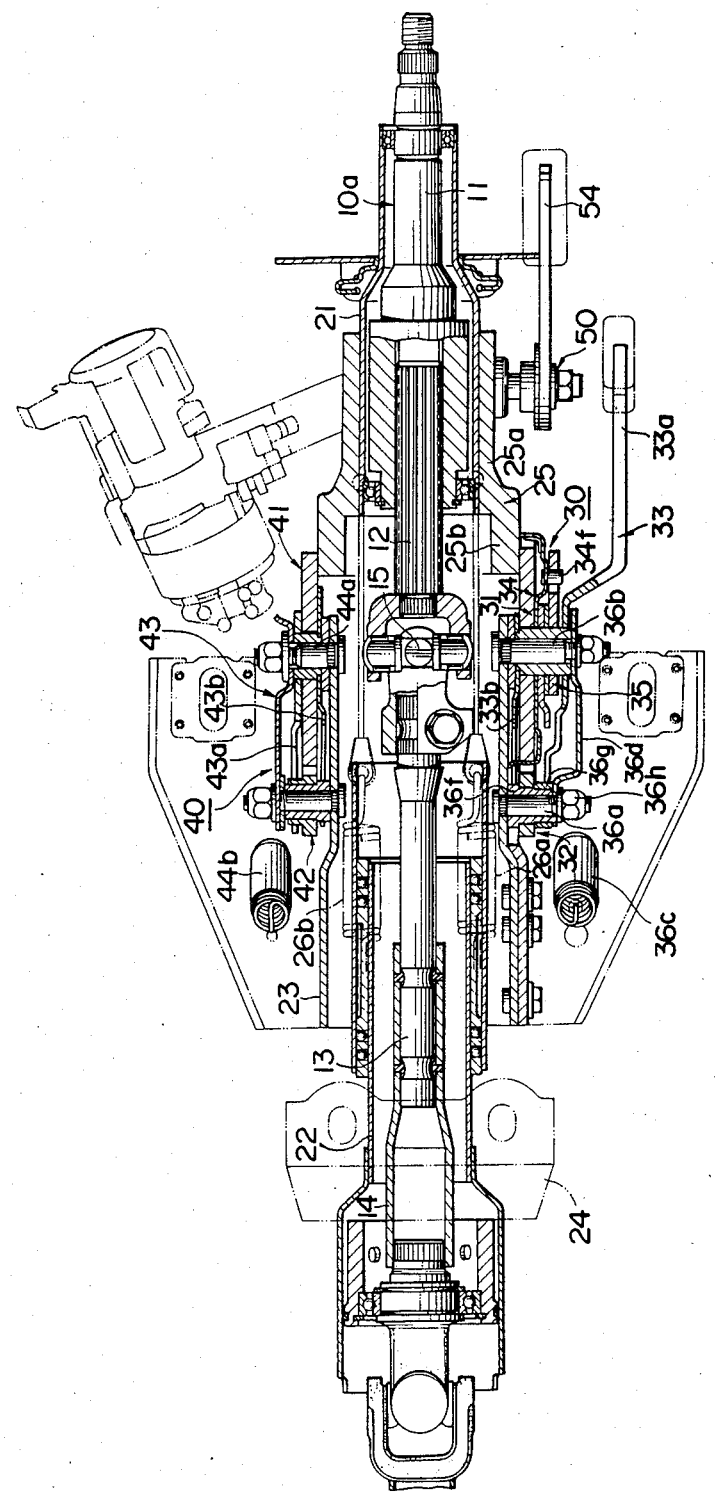
FIG. 4 is a sectional view of said first preferred embodiment tilt steering column assembly, taken in the same plane as FIG. 1 and at a magnified scale.

The ratchet 31 is a substantially planar member and is fixedly secured to the lower left side as seen in FIG. 4 of the rotatable bracket 25, and functions as a support member for said rotatable bracket 25 and for the steering wheel W and the tiltable portion of the steering column as a whole, by being rotatably fitted over a sleeve provided on a mounting bolt 36b which is fixed to the main fixing bracket 23. Thereby the aforesaid horizontal axis substantially transverse to the body of the vehicle about which the steering wheel W and the steering column as a whole tilt is defined. An edge portion of this ratchet 31 is formed with a circumferentially extending arcuate toothed portion 31a.

Figure 5:
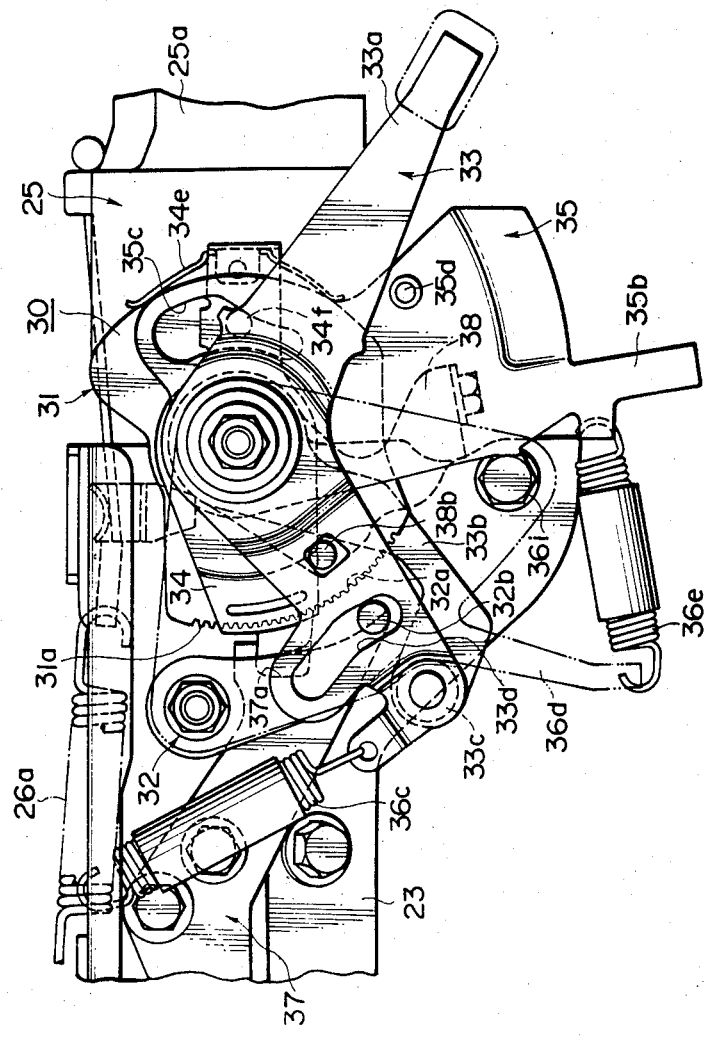
FIG. 5 is a side view of a first tilt locking mechanism shown in FIG. 2, shown at a magnified scale and at one stage of its operation.
Figure 6:
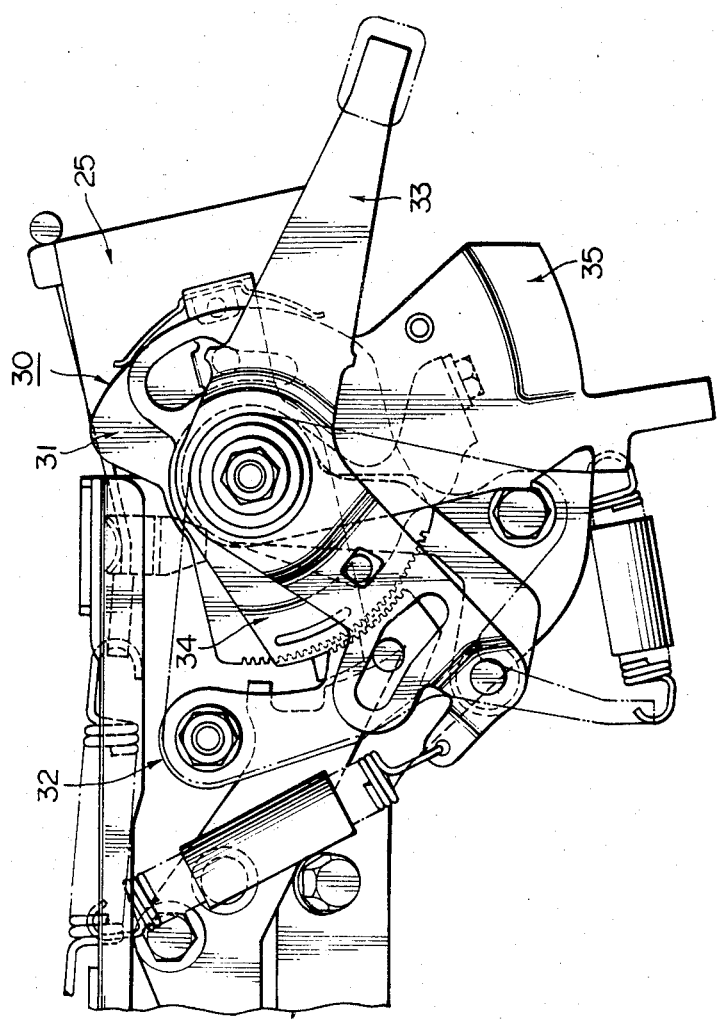
FIG. 6 is a view similar to FIG. 6, showing said first tilt locking mechanism at another stage of its operation.
Figure 7:
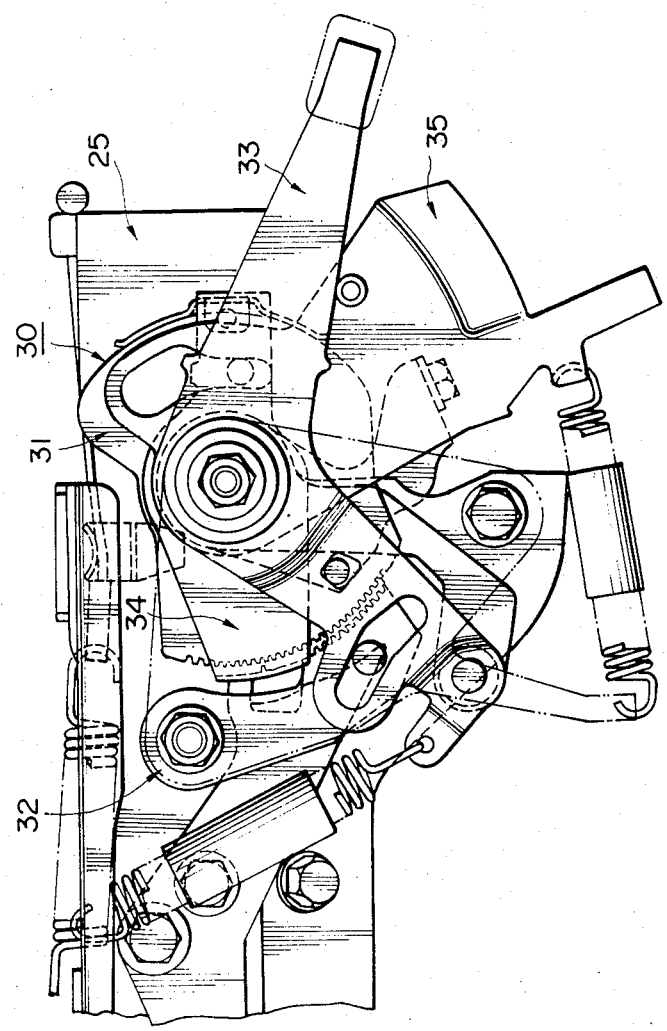
FIG. 7 is a view similar to FIGS. 6 and 7, showing said first tilt locking mechanism at yet another stage of its operation.

The pawl 32 is also a substantially planar member, and is pivotally mounted to the main fixing bracket 23 by being rotatably fitted over a sleeve provided on another mounting bolt 36a which is likewise fixed to the main fixing bracket 23 and by being retained thereto by a nut 36h; the full details of this fitting construction, which relate to the nub of the present invention, will be explained hereinafter. The pawl 32 is formed with an arcuate toothed portion 32a opposed to and confronting the arcuate toothed portion 31a of the ratchet 31. Thereby, when the pawl 32 is rotated in the clockwise direction from the point of view of FIGS. 5, 6, and 7, to its positions as seen in FIGS. 6 or 7, its arcuate toothed portion 32a is disengaged from the arcuate toothed portion 31a of the ratchet 31, and accordingly the rotation of the steering wheel W and the steering column as a whole with respect to the fixed main fixing bracket 23 around the axis of the mounting bolt 36b is not substantially impeded thereby; but, on the other hand, when said pawl 32 is rotated in the counter-clockwise direction from the point of view of FIGS. 5, 6, and 7, to its position as seen in FIG. 5, its arcuate toothed portion 32a is engaged to the arcuate toothed portion 31a of the ratchet 31, and accordingly the rotation of the steering wheel W and the steering column as a whole with respect to the fixed main fixing bracket 23 around the axis of the mounting bolt 36b is prevented and the steering column is locked into place.

Figure 8:
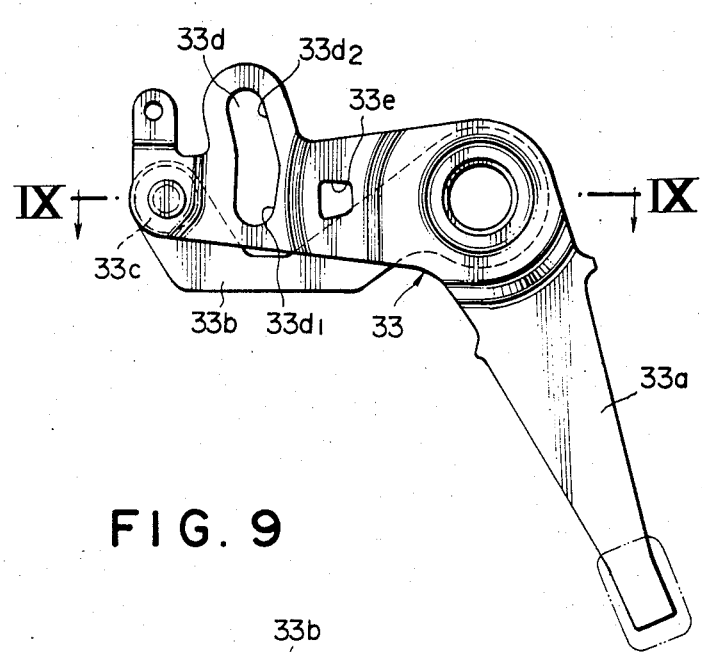
FIG. 8 is a side view of a first release lever incorporated in the first tilt locking mechanism of FIGS. 5 through 7.
Figure 9:
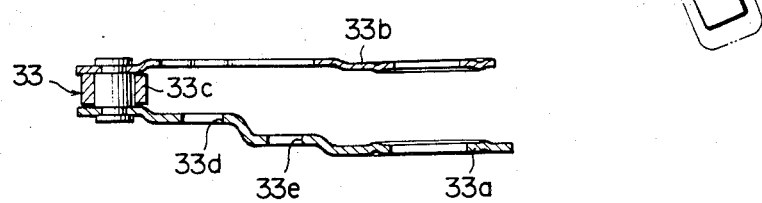
FIG. 9 is a sectional view of said first release lever as taken in a plane shown by the arrows IX—IX in FIG. 8.

The first release lever 33, which is for releasing the engagement between the pawl 32 and the ratchet 31, is formed of a lever 33a and an auxiliary plate 33b fitted thereto and extending generally parallel thereto; these members can best be seen in FIGS. 8 and 9, which show said first release lever 33 in side view and sectional view respectively. The lever 33a and the auxiliary plate 33b are connected together via the axis of a roller 33c extending between them, and both have apertures, confronting one another, which are fitted over the mounting bolt 36b previously mentioned, so as to mount the first release lever 33 to the main fixing bracket 23 in a rotatable manner around the same transverse horizontal axis as previously defined. A cam groove 33d is formed on a portion of the lever 33a, and an engagement pin 32b formed on the pawl 32 is fitted into this cam groove 33d so as to slide therein and so as to be guided thereby. One end of a tension coil spring 36c (see FIG. 5) is fitted to a hole formed in the lever 33a, and the other end of said tension coil spring 36c is hooked to a point on the main fixing bracket 23, and thereby the first release lever is biased in the clockwise direction as seen in FIG. 5, so as (provided the end of the lever 33a is not impelled by the hand of the driver) to press the roller 33c against the back of the pawl 32 so as to press said pawl 32 in the counter-clockwise direction in FIG. 5.

Figure 10:
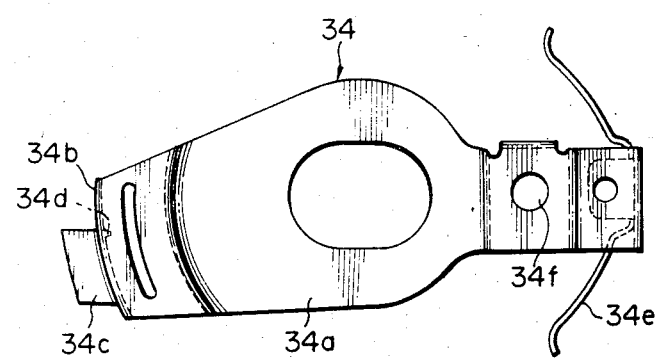
FIG. 10 is a side view of a cover plate incorporated in said first tilt locking mechanism.

The cover plate 34, a side view of which is shown in FIG. 10, is used for defining the portion of the ratchet 31 to which the pawl 32 engages, i.e. for shielding the previous portion of said ratchet 31 to which it is not desired that said pawl 32 should engage. This cover plate 34 comprises an arcuate cover portion 34b mounted on the end of a plate portion 34a. The arcuate cover portion 34b has teeth 34d formed on its concave inner surface, and a projection 34c extends out from said cover portion 34b. At the other end of said cover plate 34 there are provided an engagement pin 34f and a sheet spring 34e. The cover plate 34 is fitted over the mounting bolt 36b, on the outside of the ratchet 31, by an elongated hole formed in said cover plate 34. Thus, the sheet spring 34e engages the back side of the ratchet 31, and the cover plate 34 is both rotatable around the axis of the mounting bolt 36b and is also slidable sideways thereon through a certain distance, so as either to engage the teeth 34d formed on the inside of its arcuate cover portion 34b to the teeth 31a of said ratchet 31, or to disengage said teeth from one another; and the sheet spring 34e biases the cover plate 34 in such a direction as to press said teeth 34d and 31a into mutual engagement. Thereby, the arcuate cover portion 34b serves to blank off a part of the toothed portion 31a of the ratchet 31, leaving that covered portion of said ratchet 31 effectively smooth and free from teeth.

Figure 11:
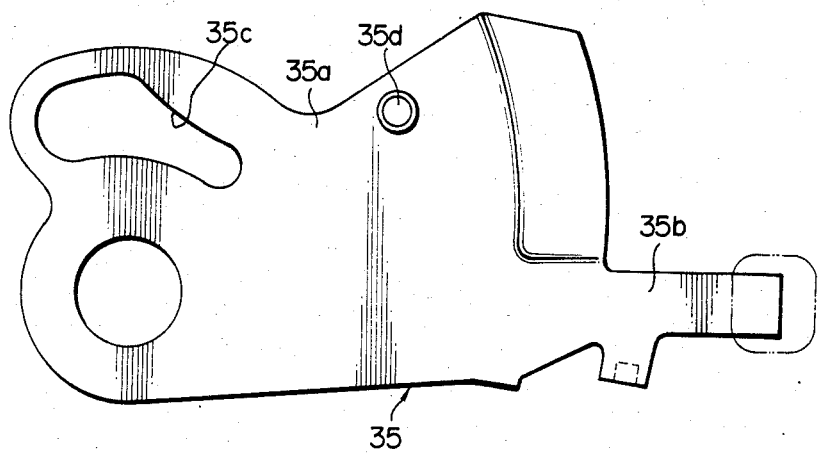
FIG. 11 is a side view of a second release lever incorporated in said first tilt locking mechanism.

The second release lever 35 is for adjusting the above described mutual meshing position of the cover plate 34 relative to the ratchet 31, by lifting and sliding the cover plate 34, and is formed as shown in side view in FIG. 11. Said second release lever 35 comprises a plate portion 35a, a lever portion 35b extending therefrom, a cam aperture 35c formed therein, and an engagement pin 35d extending sideways therefrom. This second release lever 35 is fitted, via a hole formed therein, over the mounting bolt 36b between the first release lever 33 and the cover plate 34. A retainer plate 36d is fitted over the whole assembly, as best seen in FIG. 5, and a tension coil spring 36e is stretched between a projection of said retainer plate 36d and the lever portion 35b of the second release lever 35; thereby said second release lever 35 is biased in the clockwise direction as seen in FIG. 5, and its said clockwise rotation is stopped when a portion thereof comes into contact with said retainer plate 36d. In this condition, the engagement pin 34f of the cover plate 34 engages with the cam groove 35c of said second release lever 35. A guide plate 37 is assembled to the outside of the fixed bracket 23 and an engagement depression 37a of the guide plate 37 opposes the projection 34c of the cover plate 34 so as to limit the rotation of the cover plate 34 when said cover plate 34 makes a sliding motion and the projection 34c enters into said depression 37a.

Figure 12:
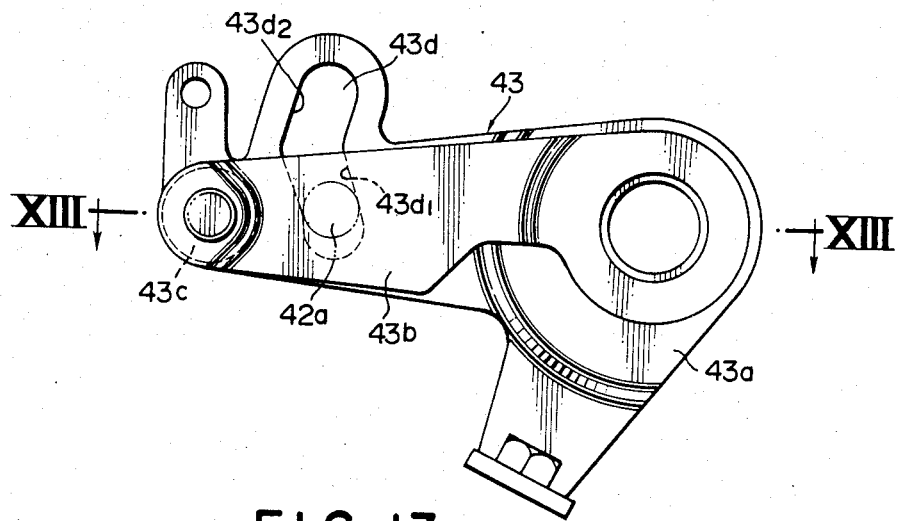
FIG. 12 is a side view of a third release lever incorporated in a second tilt locking mechanism.
Figure 13:
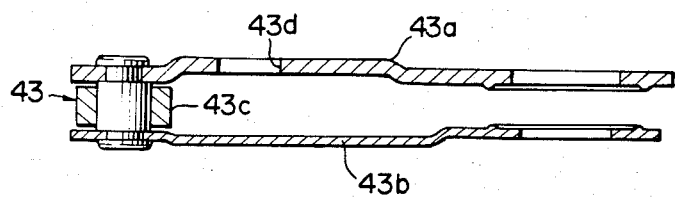
FIG. 13 is a sectional view of said third release lever as taken in a plane shown by the arrows XIII—XIII in FIG. 12.

Now tilt locking mechanism 40 will be described, with reference to FIGS. 4, 12 and 13. It comprises a ratchet 41, a pawl 42, and a third release lever 43. The ratchet 41 and the pawl 42 are similarly formed to the ratchet 31 and the pawl 32 of the first tilt locking mechanism 30 described above. Because the ratchet 41 and the pawl 42 are substantially similar to the ratchet 31 and the pawl 32 shown in FIGS. 5-7, the ratchet 41 and the pawl 42 are not shown in FIGS. 12 and 13. The third release lever 43 is for disengaging the meshing of the pawl 42 and the ratchet 41, which are assembled to the main fixing bracket 23 on the other side of it from the first tilt locking mechanism 30 by a mounting bolt 44a and another mounting bolt shown in the figures but not designated by any reference numeral, and comprises a lever member 43a and an auxiliary plate 43b fitted thereto as extending generally parallel thereto; these members can best be seen in FIGS. 12 and 13, which show said third release lever 43 in side view and sectional view respectively. The mounting bolt 44a is substantially coaxial with the mounting bolt 36b for the first tilt locking mechanism 30, and serves for pivoting the upper tube 21 to the main fixing bracket 23 so that it is rotatable around the previously defined horizontal tilt axis substantialy transverse to the body of the vehicle. The lever 43a and the auxiliary plate 43b are connected together via the axis of a roller 43c extending between them, and both have apertures, confronting one another, which are fitted over the mounting bolt 44a for the ratchet 41 previously mentioned, so as to mount the third release lever 43 to the main fixing bracket 23 in a rotatable manner around the same transverse horizontal axis as previously defined. A cam groove 43d is formed on a portion of the lever 43a, and an engagement pin 42b formed on the pawl 42 is fitted into this cam groove 43d so as to slide therein and so as to be guided thereby. One end of a tension coil spring 44b (see FIG. 5) is fitted to a hole formed in the lever 43a, and the other end of said tension coil spring 44b is hooked to a point on the main fixing bracket 23, and thereby the third release lever is biased in the direction so as (provided the end of the lever 43a is not impelled by the hand of the driver) to press the roller 43c against the back of the pawl 42 so as to press said pawl 42 in the direction to engage its toothed portion with the toothed portion of the ratchet 41.

Figure 15:
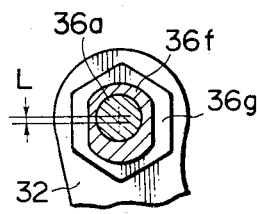
FIG. 15 is an end on view of said adjustable construction of FIG. 14.
Figure 14:
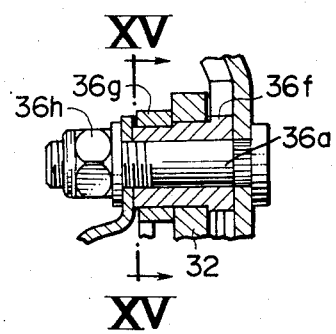
FIG. 14 is a longitudinal sectional view of an adjustable construction for rotatably mounting a pawl of said first tilt locking mechanism to a fixed member.

Now, the particular means by which the pawl 32 of the first tilt locking mechanism 30 is rotatably mounted to the main fixing bracket 23 will be particularly explained, with reference to FIGS. 14 and 15 which are a longitudinal sectional view and an end on view thereof respectively. In detail, over the previously mentioned bolt 36a, which is fixedly mounted to the main fixing bracket 23 by spline means formed proximate to the head portion of said bolt 36a, there is fitted an eccentric collar 36f which is formed as a tubular eccentric cam with two flats on its end portion. The middle portion of this collar 36f, over which the cam 32 fits and on which said cam 32 turns, is formed with a cylindrical inner surface and with a cylindrical outer surface which are eccentrically offset from one another by a certain distance L; and the cylindrical inner surface rotatably slides on the outer surface of the mounting bolt 36a, while on the cylindrical outer surface there is rotatably mounted the cam 32. On the end portion of this collar 36f, over the two flats formed thereon, there is fitted a spacer 36g whose outer surface is formed in a hexagonal shape. The whole is retained by the nut 36h. As a result, the rotation of the spacer 36g causes an integral rotation of the eccentric collar 36f, thereby allowing the center of the swinging motion of the pawl 32 to be adjusted within a range of plus L to minus L. The eccentric collar 36f is located between the main fixing bracket 23 and the retainer plate 36d and is restricted from rotational motion after the device is fitted, by the fastening force of the nut 36h which compresses said collar 36f.

Figure 16:
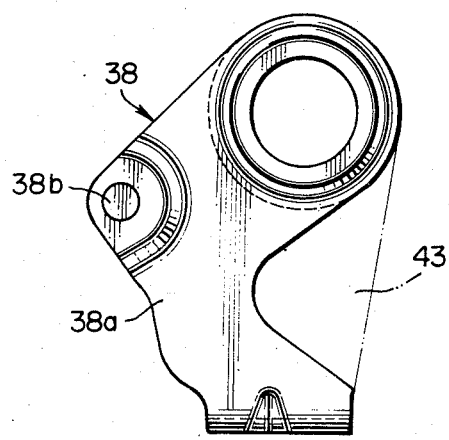
FIG. 16 is an end on view of a connecting lever which connects the first and third levers, shown in FIGS. 8 and 12, of the first and the second tilt locking mechanisms.
Figure 17:
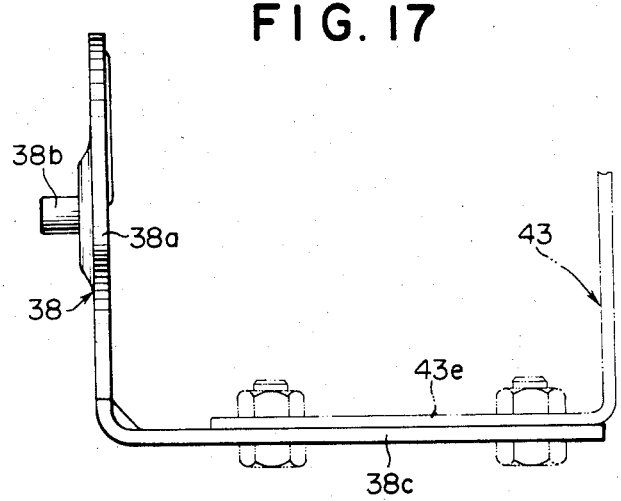
FIG. 17 is a side view of said connecting lever of FIG. 16.

The first release lever 33 of the first tilt locking mechanism 30 and the third release lever 43 of the second tilt locking mechanism 40 are connected together by a connecting member 38, which is shown in end on view in FIG. 16 and in side view in FIG. 17. This connecting member 38 is a lever which is bent into a L shape, and is rotatably fitted onto the mounting bolt 36b between the cover plate 34 and the second release lever 35. A connection pin 38b formed on the connecting member 38 is fitted into a connection aperture 33e formed in the first release lever 33, while an arm portion 43e formed on the release lever 43 is fixed by bolts or similar suitable means to an arm portion 38c extending from the lower end of the plate portion 38a of the connecting member 38 in the rightward direction as seen in FIG. 17. Thus, the first release lever 33 and the third release lever 43 are connected together, so that the rotational operation of the first release lever 33 causes the rotation of the connection member 38 which in turn rotates the third release lever 43.

The cam grooves 33d and 43d provided in the first and third release levers 33 and 43 respectively are formed in an asymmetric manner, and there is a certain time lag in the meshing and the release of meshing of the pawls 32 and 42 with their respective ratchets 31 and 41. The cam groove 33d of the first release lever 33 (vide FIG. 8) is formed with an arcuate portion 33d1 at its proximal end portion the center of which is the central axis of the mounting bolt 36b, and with a cam portion 33d2 at its free end portion. The cam groove 43d of the third release lever 43 is formed with a cam portion 43d1 at its proximal end portion and with an arcuate portion 43d2 at its free end portion the center of which is the central axis of the mounting bolt 44a. Thus, when the first and the third release levers 33 and 43 rotate, the pressures of the rollers 33c and 43c on the pawls 32 and 42 respectively actuated thereby are released at the same time, but, thereafter, the pawl 42 is displaced from the ratchet 41 to be disengaged therefrom first and then subsequently the pawl 32 is displaced from the ratchet 31 to be disengaged therefrom. Furthermore, when the two pawls 32 and 42 mesh with their respective ratchets 31 and 41, the pawl 32 has a priority.

Figure 18:
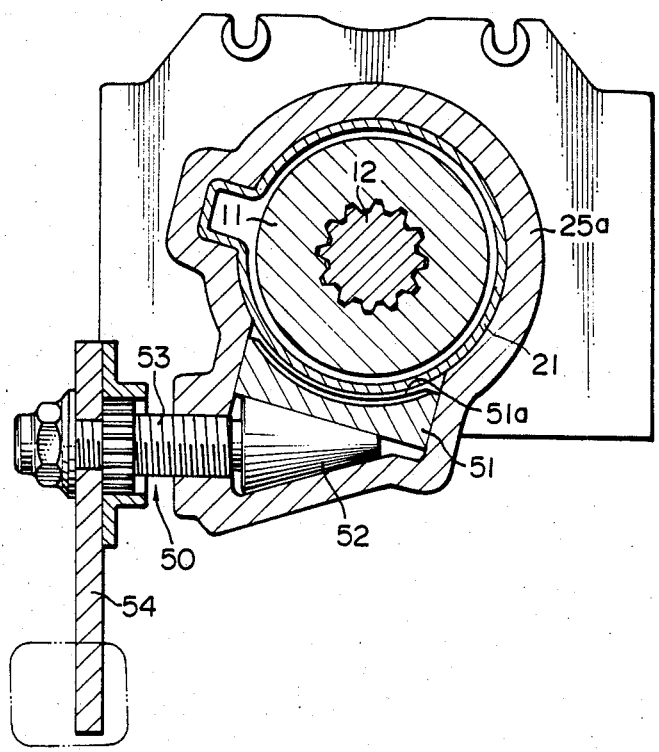
FIG. 18 is a front view of a lock mechanism for selectably allowing or preventing the telescopic action of the steering column.

Now, the lock mechanism 50 for selectably preventing the sliding of the upper tube 21 in the rotatable bracket 25 will be described, with reference to FIG. 18 which shows it in front view. This lock mechanism 50 comprises a locking member 51, a pressing member 52, a threaded rod 53, and a lock lever 54. In this lock mechanism 50, the threaded rod 53 is threadedly engaged in the tubular portion 25a of the rotatable bracket 25, and the pressure member 52 is fixedly secured by means of a screw (not particularly shown) to its inner end. The pressure member 52 is conical in shape, and when pressed against the lock member 51 tends to impel it towards the upper tube 12. The outer end of the threaded rod 53 is coupled to one end of the lock lever 54. Accordingly, when the lock lever 54 is rotated by the hand of the driver in a direction to rotate the threaded rod 53 in the direction to withdraw it from the tubular portion 25a of the rotatable bracket 25, then the pressure member 52 is not significantly pressed inwards against the lock member 51, and hence the upper tube 21 is not particularly locked to said tubular portion 25a of the rotatable bracket 25, thus allowing telescoping of the steering column; but, on the other hand, when the lock lever 54 is rotated by the hand of the driver in the other direction, to rotate the threaded rod 53 in the other direction so as to screw it into the tubular portion 25a of the rotatable bracket 25, then the pressure member 52 is pressed inwards against the lock member 51, and its tapered shape impels the lock member 51 in the direction towards the upper tube 21 (upwards as seen in FIG. 18), and hence the upper tube 21 is locked to said tubular portion 25a of the rotatable bracket 25, thus preventing telescoping of the steering column.

Now, the operation of the tilt steering device as described above will be explained.

When the first release lever 33 of the first tilt locking mechanism 30 is not operated, the rotatable bracket 25 is locked to the main fixing bracket 23 by means of the two tilt locking mechanisms 30 and 40. In this state of the apparatus, the first tilt locking mechanism 30 is in its state as shown in FIG. 5, with its pawl 32 engaged with its ratchet 31; and the secodn tilt locking mechanism 40 is also in a similar state, mutatis mutandis, with its pawl 42 engaged with its ratchet 41, and with its third release lever 43 in a like position to that of the first release lever 33.

From this locked state, when the hand of the driver is applied to the end of the first release lever 33 of the first tilt locking mechanism 30, so as to rotate said first release lever 33 in the counterclockwise direction as seen in FIG. 5, then the connection member 38 and the third release lever 43 of the second tilt locking mechanism 40 are rotated in the same direction. As a result, the pressures exerted on the pawls 32 and 42 respectively by the rollers 33c and 43c provided on the first and third release levers 33 and 43 respectively of the first and second tilt locking mechanisms 30 and 40 are released substantially at the same time, but, because of the difference in the forms and the actions of the cam grooves 33d and 43d, the pawl 42 of the second tilt locking mechanism 40 is displaced from its ratchet 41 first to release said second tilt locking mechanism 40, and only subsequently is the pawl 32 of the first tilt locking mechanism 30 displaced from its ratchet 31 to release said first tilt locking mechanism 30. This effect of first releasing tilt locking mechanism which is displaced sideways from the first release lever 33 which is being manually operated is to prevent twisting of the mechanism. When the locking of the rotatable bracket 25 to the main fixing bracket 23 by the two tilt locking mechanisms 30 and 40 is released, then by the actions of the tension coil springs 26a and 26b the rotatable bracket 25 as well as the upper tube 21, the upper shaft assembly 10a, and the steering wheel W are lifted up, and the position of the elements of the first tilt locking mechanism 30 becomes as shown in FIG. 6.

In this situation of the first tilt locking mechanism 30, the inner teeth 34a of the arcuate portion 34b of the cover plate 34 are still meshed with those of the teeth 31a of the ratchet 31 with which they were previously meshed, not having moved, and said arcuate portion 34b is still covering the same portion of said ratchet 31, not having moved relative thereto, and the pawl 32 has raised up from those of the teeth 31a of said ratchet 31 with which it was previously meshed, and is now confronting the smooth outside surface of said arcuate portion 34b of said cover plate 34. Therefore, when the driver simply pushes downwards on the steering wheel W, the pawl 32 which was being pressed by the roller 33c slides over the smooth outside surface of said arcuate portion 34b of said cover plate 34, until it reaches those of the teeth 31a of said ratchet 31 with which it was previously meshed, and then it snaps downwards thereagainst and locks to those particular teeth again. At this time, in the second tilt locking mechanism 40, the roller 43c presses the pawl 42, but, before the meshing of the ratchet 31 and the pawl 32 of the first tilt locking mechanism 30 as described above, the ratchet 41 and the pawl 42 of said second tilt locking mechanism 40 are still displaced from one another by the action of the engagement pin 42 and the cam groove 43d as explained above, and the pawl 42 and the ratchet 41 mesh together only immediately after the meshing of the ratchet 31 and the pawl 32 of the first tilt locking mechanism 30. Thus, this tilt locking system is equipped with so called memory, and as a result the steering wheel W always returns to the initial position.

Now, the manner in which this memorized position of the steering wheel W may be adjusted will be described. In this case, from the state of the members of the first tilt locking mechanism 30 shown in FIG. 5, the second release lever 35 is rotationally moved by the vehicle operator in the counterclockwise direction as seen in the figure. As a result, the cover plate 34 is slidably moved to the left as seen in FIG. 5 by the action of the engagement pin 34f and the cam groove 35c of the second release lever 35, and its cover portion 34b is displaced from the ratchet 31 with its teeth 34a becoming disengaged from the ratchet teeth 31a, while the projection 34c of the cover plate 34 enters the engagement depression 37a of the guide plate 37. Therefore, the cover plate 34 can be rotated with respect to the ratchet 31. And when the second release lever 35 is further rotationally operated, the engagement pin 35d provided on said second release lever 35 is engaged with the first release lever 33 so as to integrally rotate it. As a result, the third release lever 43 of the second tilt locking mechanism 40 is simultaneously rotated by way of the connection member 38, and, as shown in FIG. 7, the lock of the fixed bracket 23 on the rotational bracket 25 by the two tilt locking mechanisms 30 and 40 is released. Therefore, the steering wheel W may be moved vertically while the second release lever 35 is retained at its rotational position, and after the steering wheel W is vertically adjusted to a desired position the releasing of the operation of the second release lever 35 causes the rotational restoration of the first and third release levers 33 and 43, thereby causing the pawls 32 and 42 to mesh with portions of the arcuate teeth portions 31a and 41a of their ratchets 31 and 41 which are different from the positions with which they were previously meshed. Thereafter, the second release lever 35 rotationally restores itself and returns the cover plate 34 back to its non-operational position so as to make its teeth portion 34d mesh with and cover a portion of the arcuate teeth portion 31a of the ratchet 31 which is different from the previously meshed with and covered portion. In this case, the teeth portion 34d of the cover plate 34 meshes with a teeth portion 31a of the ratchet 31 which is angularly displaced from the previous teeth portion which was meshed with the opposing member prior to the positional adjustment of the steering wheel W, by the angle through which the steering wheel W has been adjusted, and the newly adjusted position of the steering wheel W is thus memorized.

Thus, according to the shown construction, the upper tube 20 and the upper steering shaft assembly 10a and the steering wheel W mounted thereon can be supported on the two sides of the main fixing bracket 23 which is fixedly secured with respect to the lower tube 22, by means of the two tilt locking mechanisms 30 and 40 the operation of which is linked together as explained above. Therefore, it has become possible to obtain very good vibrational characteristics of the entire device, by increasing the rigidity of support of the upper tube 21 and its associated members. In this shown construction, since the first and third release levers 33 and 43 are connected together for synchronization by the connecting member 38, the operability of the first and second tilt locking mechanisms 30 and 40 is quite favorable.

According to the concept of the present invention, particularly, since in this first preferred embodiment the mounting bolt 36a, the eccentric collar 36f, the spacer 36g, and the fastening nut 36h are used as the assembling means for the pawl 32 of the first tilt locking mechanism 30, as shown in FIGS. 14 and 15, by turning the eccentric collar 36f and the spacer 36g integral therewith in assembling the pawl 32 to the first tilt locking mechanism 30, the swing center of the pawl 32 can be adjusted to a desired position within a certain range, and thus the meshing state between the pawl 32 and the ratchet 31 can be adjusted. Therefore, according to this first preferred embodiment, by first assembling the pawl 42 of the second tilt locking mechanism 40 and, after meshing said pawl 42 with the ratchet 41, subsequently assembling the pawl 32 of the first tilt locking mechanism 30 with its swing center properly adjusted as described above, the meshing states of the pawls 32 and 42 relative to the ratchets 31 and 41, respectively, can be set correctly, irrespective of the inevitable manufacturing errors and assembling errors of the various components of the two tilt mechanisms 30 and 40.

The present invention is not limited to application to the type of tilt steering device shown above, although that is its most preferred application. Various other possibilities are also conceivable. For example, it would be possible to apply the construction, explained above with respect to the pivoting of the pawl 32 of the first tilt locking mechanism 30, for pivoting the pawl 42 of the second tilt locking mechanism 40. Alternatively, it would be possible to construct the tilt locking mechanisms 30 and 40 in the reverse manner, with the ratchets 31 and 41 instead assembled to the main fixing bracket 23, and with the pawls 32 and 42 rotatably mounted to the rotatable bracket 25. In either case, it will be clear to one of ordinary skill in the art, based upon the descriptions contained in this specification, that the same advantages as accrued in the case of the first preferred embodiment of the present invention described above will be available.

Further, the present invention can be applied to a tilt steering column of a type disclosed in Japanese Utility Model Publication Serial No. 57-53730 applied for by the assignee of the present patent application. This type of tilt steering column is not provided with any memory function or any telescopic function. For applying this invention to a tilt steering column in which the upper tube is directly pivoted to the lower tube, the ratchets may be assembled to either one of the tubes, while the pawls may be rotatably mounted to the other tube. Therefore, although the present invention has been shown and described with reference to the preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiments, or of the drawings, but solely by the scope of the appended claims, which follow.

What is claimed is:

1. A tiltable steering column for an automotive vehicle, comprising:
 (a) a main steering shaft comprising a lower steering shaft and an upper steering shaft tiltably rotationally connected to said lower steering shaft;
 (b) a column tube assembly, comprising:
  (b1) a lower tube which rotatably supports said lower steering shaft from a body of said automotive vehicle; and
  (b2) an upper tube which rotatably supports said upper steering shaft and is pivotally mounted so as to be able to tilt relative to said lower tube; and (c) a tilt locking mechanism, comprising a first side ratchet mechanism on a first side of said column tube assembly and a second side ratchet mechanism on a second side of said column tube assembly opposite said first side, said first and second side ratchet mechanisms each comprising:
  (c1) a first and a second ratchet each fixedly attached to one of said upper tube and said lower tube;
  (c2) a first and a second pawl each pivotally attached to the other of said upper tube and said lower tube so as to be pivotable about an axis of pivotal rotation;
  (c3) a means for continuously biasing said first and second pawls so as to engage them respectively with said first and second ratchets; and
  (c4) a means for selectively biasing said first and second pawls so as to release said respective engagement thereof with said first and second ratchets;
and further comprising:

a means for shifting the axis of pivotal rotation of one of said first and second pawls relative to the axis of pivotal rotation of the other of said first and second pawls.

2. A tiltable steering column for an automotive vehicle according to claim 1, wherein said means for shifting the axis of pivotal rotation of one of said first and second pawls shifts said axis of pivotal rotation of said one pawl in parallel thereto.

3. A tiltable steering column for an automtotive vehicle according to claim 2, wherein said means for shifting the axis of pivotal rotation of one of said first and second pawls comprises:
  a pin, fixedly mounted relative to the one of said upper tube and said lower tube to which said one pawl is pivotally attached; and
  a tubular eccentric cam fitted over said pin, said one pawl being fitted over said tubular eccentric cam and said axis of pivotal rotation of said one pawl being shifted by a rotation of said tubular eccentric cam around said pin.

* * * * *